United States Patent
Zhang et al.

(10) Patent No.: US 6,596,156 B1
(45) Date of Patent: Jul. 22, 2003

(54) SAPO-11 MOLECULAR SIEVE, ITS SYNTHETIC METHOD AND A CATALYST CONTAINING THE MOLECULAR SIEVE

(75) Inventors: Fengmei Zhang, Beijing (CN); Yucming Liu, Beijing (CN); Xingtian Shu, Beijing (CN); Weidong Wang, Beijing (CN); Fengming Qin, Beijing (CN)

(73) Assignees: China Petroleum and Chemical Corporation, Beijing (CN); Research Institute of Petroleum Processing, Sinopec, Beijing (CN)

( * ) Notice: Subject to any disclaimer, the term of this patent is extended or adjusted under 35 U.S.C. 154(b) by 135 days.

(21) Appl. No.: 09/914,909

(22) PCT Filed: Jan. 5, 2001

(86) PCT No.: PCT/CN01/00010
§ 371 (c)(1),
(2), (4) Date: Sep. 5, 2001

(87) PCT Pub. No.: WO02/053499
PCT Pub. Date: Jul. 11, 2002

(51) Int. Cl.$^7$ .......................... C01B 39/54; B01J 29/85; C10G 47/18
(52) U.S. Cl. ..................... 208/137; 208/134; 208/135; 502/208; 502/213; 502/214; 423/305
(58) Field of Search ................................ 208/134, 135, 208/137; 502/208, 213, 214; 423/304, 305

(56) References Cited

U.S. PATENT DOCUMENTS

| | | | |
|---|---|---|---|
| 4,310,440 A | 1/1982 | Wilson et al. | |
| 4,440,871 A | 4/1984 | Lok et al. | |
| 4,710,485 A | 12/1987 | Miller | |
| 4,943,424 A | 7/1990 | Miller | |
| 5,087,347 A | 2/1992 | Miller | |
| 5,096,684 A | * 3/1992 | Guth et al. | 423/705 |
| 5,208,005 A | 5/1993 | Miller | |
| 5,296,208 A | * 3/1994 | Lesch | 423/700 |
| 5,514,362 A | * 5/1996 | Miller | 423/702 |

* cited by examiner

Primary Examiner—Tom Dunn
Assistant Examiner—Christina Ildebrando
(74) Attorney, Agent, or Firm—Scully, Scott, Murphy & Presser

(57) ABSTRACT

A SAPO-11 silicoaluminopihosphate molecular sieve, its preparation method, and a catalyst containing the same are disclosed. The X-ray diffraction data of the molecular sieve before removing the template by calcination are as listed in Table 1. The molar composition of this molecular sieve after removing the template by calcination expressed in anhydrous oxides is $Al_2O_3$: $yP_2O_5$: $zSiO_2$, in which y has a value of 0.60–1.20, and z has a value of 0.05–1.3, characterized in that after removing the template by calcination, its X-ray diffraction data are as listed in Table 3, and that the crystal structures of the molecular sieve before and after removing the template by calcination are substantially the same. The catalyst is composed of 10–85% by weight of said SAPO-11 molecular sieve, 0.05–1.5% by weight of Pd or Pt, and the balance is alumina. In comparison with similar catalysts in the prior art, when the catalyst of this invention is applied in the reaction of hydrocarbon hydroisomerization, both selectivity and product yield for isomerization are remarkably increased.

27 Claims, No Drawings

SAPO-11 MOLECULAR SIEVE, ITS SYNTHETIC METHOD AND A CATALYST CONTAINING THE MOLECULAR SIEVE

FIELD OF THE INVENTION

This invention relates to a silicoaluminophosphate molecular sieve (SAPO-11) with AEL-type structure, its synthetic method, and a catalyst containing the same, especially a catalyst for hydrocarbon hydroisomerization.

DESCRIPTION OF THE PRIOR ART

Aluminophosphate molecular sieves are molecular sieves of a new generation developed by UCC of the United States of America in early 1980's (U.S. Pat. No. 4,310,440) following the aluminosilicate molecular sieves. The typical character of this class of molecular sieve is that their framework is constructed by alternative connection of phosphorus-oxygen tetrahedrons and aluminum-oxygen tetrahedrons, and since the framework of the molecular sieves appears electrically neutralized, they have no capability for carrying out cation exchange and catalytic reaction.

The aluminophosphate ($AlPO_4$- 11) molecular sieve with AEL-type structure is a member of the aluminophosphate molecular sieve family, which belongs to the orthorhombic crystal system with a space group of Ima2. Its crystal unit cell parameters are a=18.7 Å, b=13.4 Å, and c=8.4 Å, and the one dimensional pore size of its 10-member ring is 3.9×6.3 Å. Its typical X-ray diffraction data are listed in Table 1. After removing amine by calcination, it still belongs to the orthorhombic system, but its symmetry is changed and the space group turns to $Pna2_1$, with the crystal unit cell parameters of a=18.1 ÅA, b=13.8 Å, and c=8.1 Å. Its X-ray diffraction pattern is apparently different from that before calcination, and the data of a typical X-ray diffraction pattern is listed in Table 2.

TABLE 1

| 2 θ | d | 100 × $I/I_0$ |
|---|---|---|
| 8.05–8.15 | 10.97–10.84 | w-m |
| 9.40–9.50 | 9.40–9.30 | m |
| 13.10–13.25 | 6.75–6.68 | m |
| 15.65–15.85 | 5.66–5.59 | m |
| 20.35–20.55 | 4.36–4.32 | m |
| 21.00–21.20 | 4.23–4.19 | vs |
| 22.10–22.25 | 4.02–3.99 | m |
| 22.50–22.90 (doublet) | 3.95–3.88 | m |
| 23.10–23.35 | 3.85–3.81 | m-s |

*w-m: <20; m: 20–70; s: 70–90; vs: 90–100

TABLE 2

| 2 θ | d | 100 × $I/I_0$ |
|---|---|---|
| 8.00–8.15 | 11.04–10.84 | w-m |
| 9.70–9.85 | 9.11–8.97 | m |
| 12.70–12.90 | 6.96–6.86 | w-m |
| 15.95–16.10 | 5.55–5.50 | m |
| 21.80–21.95 | 4.07–4.05 | vs |
| 22.05–22.15 | 4.03–4.01 | m |
| 22.35–22.50 | 3.97–3.95 | m |
| 23.25–23.55 (doublet) | 3.82–3.77 | m |

*w-m: <20; m: 20–70; s: 70–90; vs: 90–100

Silicoaluminophosphate molecular sieves, i.e. SAPO molecular sieve series are formed when silicon is incorporated into the framework of aluminophosphate molecular sieves (UCC of USA, U.S. Pat. No. 4,440,871). Their framework is constructed with phosphorus-oxygen tetrahedrons, aluminum-oxygen tetrahedrons, and silicon-oxygen tetrahedrons, and since their framework carries negative charge, they have non-framework cations in balance and the capability of cation exchange. If the non-framework cations are $H^+$, they have acidic catalytic capability since they have acidic centers.

The aluminophosphate molecular sieve with AEL structure containing silicon (SAPO-11) has the same structure and XRD pattern as that containing no silicon ($AlPO_4$-11), but after removing amine by calcination, the structure of a molecular sieve has different states. According to the results reported in U.S. Pat. No. 4,440,871, the typical data of the X-ray diffraction pattern of a synthesized silicoaluminophosphate molecular sieve with AEL structure are the same as listed in Table 1. After removing amine by calcination, the data of the X-ray diffraction patterns are different depending on the raw materials adopted. When the molecular sieve is synthesized using phosphoric acid as a phosphorus source, aluminum isopropoxide as an aluminum source, fuming silica gel as a silicon source, and di-n-propylamine as a template, its data of X-ray diffraction pattern after removing amine by calcination is partly changed with the appearance of the diffraction peaks at 2θ=12.8, 16.1, and 21.9°, etc, and the newly appearing peaks are substantially the same as the data of the X-ray diffraction pattern of the aluminophosphate having AEL structure and containing no silicon ($AlPO_4$-11) after removing amine by calcination, showing that the crystal structure of the molecular sieve synthesized by this method is partly changed after removing amine by calcination. When the molecular sieve is synthesized by using phosphoric acid, aluminum isopropoxide, silica sol and di-n-propylamine as the raw materials, the data of the X-ray diffraction pattern are remarkably changed with the appearance of the diffraction peaks at 2θ=9.85, 12.8, 16.1, and 21.95°, and the thorough disappearance of the peaks at 2θ=9.4, 13.1, 15.65, and 21.1° at the same time. These data are the same as the data of the X-ray diffraction pattern of the aluminophosphate molecular sieve containing no silicon ($AlPO_4$-11) after removing amine by calcination. These results suggest that the structure of the molecular sieve with AEL structure after calcination is different depending on its composition and synthetic method.

U.S. Pat. Nos. 4,943,424 and 5,208,005 also disclose a molecular sieve with AEL structure (SM-3) and its synthetic method. The data of the X-ray diffraction pattern of said molecular sieve are substantially the same as those of the molecular sieve disclosed in U.S. Pat. No. 4,440,871. After removing amine by calcination, however, its X-ray diffraction data are completely the same as those of the molecular sieve with AEL structure containing no silicon after removing amine by calcination, indicating that the structure of the molecular sieve is also changed after removing amine by calcination. The other feature of the molecular sieve emphasized by the two patents is the enriched silicon on the surface of the molecular sieves derived by their synthetic method.

Regarding the method for synthesizing the aluminophosphate and silicoaluminophosphate molecular sieves with AEL structure, the synthetic method described in U.S. Pat. No. 4,310,440 comprises: taking phosphoric acid as a phosphorus source, hydrated alumina (pseudo-boehmite) as an aluminum source, di-n-propylamine or di-isopropylamine, ethylbutylamine, di-n-butylamine, di-n-pentylamine, as an organic template, adding hydrated alumina into the aqueous solution of phosphoric acid in a ratio of 1.0R: $P_2O_5$: $Al_2O_3$:

40H$_2$O, stirring to uniformity, adding the organic template after stirring to uniformity, sealing the mixture into a stainless steel autoclave lined with Teflon after stirring to uniformity, crystallizing at 200° C. for 24–48 hours, and then filtering, washing, and drying, to yield the molecular sieve product.

In the method provided in U.S. Pat. No. 4,440,871 for synthesizing a silicoaluminophosphate molecular sieve with AEL structure, the phosphorus source used is phosphoric acid, the aluminum source is aluminum isopropoxide or hydrated alumina, the silicon source is fuming silica gel or silica sol, and the organic template is di-n-propylamine or di-isopropylamine. When aluminum isopropoxide is used as the aluminum source, phosphoric acid was first added into the mixture of aluminum isopropoxide and water, and after stirring to uniformity, fuming silica gel is added. Then di-n-propylamine is added after stirring and the stirring is continued until the mixture becomes uniform. The mixture is sealed into a stainless steel autoclave lined with Teflon, and crystallized at 150–200C. to obtain the molecular sieves. When hydrated alumina (pseudo-boehmite) is used as the aluminum source, the hydrated alumina was added into the aqueous solution of phosphoric acid, and after stirring to uniformity, the mixture of fuming silica gel and tetrabutylammonium hydroxide is added. The mixture is stirred to uniformity, and the template di-n-propylamine is added. Then crystallization is carried out after stirring to uniformity to obtain the molecular sieve product. When aluminum isopropoxide is used as the aluminum source, and silica sol is used as the silicon source, the structure of the obtained molecular sieve is thoroughly changed after removing amine by calcination. It is worthy to note that, in the method provided in the aforesaid patents, the influence of the gelation temperature has not been mentioned.

In the method provided by U.S. Pat. Nos. 4,943,424 and 5,208,005 for synthesizing a silicoaluminophosphate molecular sieve with AEL structure, phosphoric acid, aluminum isopropoxide, fuming silica gel and di-n-propylamine are used as the raw materials. Under the ice bath condition, aluminum isopropoxide is added into the aqueous solution of phosphoric acid, and fuming silica gel or a mixture of fuming silica gel and water is added after mixing to uniformity. Then di-n-propylamine is added, and after mixing or grinding, the mixture was charged in a stainless steel vessel for crystallization, and the molecular sieve product is obtained. This method emphasis that the pH value after gelation should be adjusted to 6.0–8.0, and the optimum crystallization temperature is in the range of 170–240° C. The crystal structure of the product obtained is changed after removing amine by calcination.

The technology of the shape selective isomerization of hydrocarbon oil is well known. Generally, this technology is applied to treat wax oil for reducing the content of normal paraffins. In order to improve the performance of the oil products, normal paraffins, especially long chain normal paraffins presented in the oil products should be removed as much as possible. For example, the octane number of the gasoline fraction can be boosted by removing the straight chain paraffins through shape selective cracking or converting them into branched paraffins by isomerization. For diesel oil or lubricant oil, their freezing point or pouring point can be lowered by removing the straight chain paraffins to improve their low temperature performance. Another key problem is the yield of the target product in the above reaction process. Since the reactant can be converted to lower hydrocarbons with smaller molecules by cracking, the yield of the target product may be lowered. Therefore, the isomerization reaction should be enhanced as much as possible, and the cracking reaction should be reduced as much as possible at the same time.

In view of the thermodynamic point, cracking reaction needs relatively strong acidic centers in the catalyst and relatively high reaction temperatures, and relatively weak acidic centers in the catalyst and relatively low reaction temperature are beneficial to the isomerization reaction. However, in order to increase the reaction activity and overcome the shortcomings of low reaction efficiency caused by low activity of the catalyst with weak acid centers and low reaction temperature, it is needed to load active metal components with hydrogenation and dehydrogenation functions for preparing bifunctional catalysts.

Isomerization catalysts with silicoaluminophosphate molecular sieves as an acidic active component are described in U.S. Pat. Nos. 4,710,485 and 5,087,347.

U.S. Pat. No. 4,710,485 discloses a technology using a silicoaluminophosphate molecular sieve as an isomerization catalyst. The silicoaluminophosphate molecular sieves are selected from mesopore molecular sieves such as SAPO-11or SAPO-41. SAPO-11 and SAPO-41 molecular sieves are synthesized according the method disclosed in U.S. Pat. No. 4,440,871. Their properties are also the same as those of the molecular sieves disclosed in U.S. Pat. No. 4,440,871, especially the SAPO-11 molecular sieve. Its characteristic peaks of the X-ray diffraction pattern are the same as those of the molecular sieve disclosed in U.S. Pat. No. 4,440,871, which is changed to a certain extent after calcination at high temperature, i.e., the characteristic of the SAPO-11 molecular sieve used in the technology disclosed in U.S. Pat. No. 4,710,485 which uses silicoaluminophosphate molecular sieves as the isomerization catalyst is that the structure of the molecular sieves is partly or completely changed after high temperature calcination.

U.S. Pat. No. 5,087,347 discloses a technology using a silicoaluminophosphate molecular sieves as the isomerization catalyst, in which the silicoaluminophosphate molecular sieve is selected from mesopore molecular sieve SM-3. Molecular sieve SM-3 has identical X-ray diffraction pattern with SAPO-11 molecular sieve disclosed in U.S. Pat. No. 4,440,871, but the surface composition of the SM-3 molecular sieve is different from that of the SAPO-11 molecular sieve, in particular, the surface is silicon enriched. When the isomerization catalyst with the SM-3 molecular as an acidic component is used in the n-octane conversion reaction, its activity is enhanced. When the SM-3 molecular sieve is calcined at a high temperature, its XRD spectra have the features of the characteristic peaks shown in Table 2, that is, its structure changes completely.

The crystal structures of all the molecular sieves reported in the prior art are changed after removing template by calcination, and therefore it is taken for granted that the crystal structure of the SAPS-11 molecular sieve should be changed after removing template by calcination. But the inventors of this invention have found that by controlling certain synthetic conditions, the structure of the SAPO-11 molecular sieve can be stabilized, that is, after removing template by calcination, the structure of the molecular sieve remains substantially unchanged. Further more, when the SAPO-11 molecular sieve having a stable crystal structure is used as an acidic component in the catalyst for paraffin hydroisomerization, the isomerization selectivity and isomerization product yield can be significantly increased.

OBJECTIVES OF THE INVENTION

Based on the above description, the objective of this invention is to provide a silicoaluminophosphate molecular sieve with AEL structure (SAPO-11), the data of the X-ray diffraction pattern of which is substantially unchanged after removing template by calcination in comparison with those before removing the template by calcination. This means that the molecular sieve has superior structure stability.

Another objective of this invention is to provide a method for preparing said molecular sieve.

A further objective of this invention is to provide a catalyst containing said SAPO-11 molecular sieve and noble metals. When this catalyst is used in hydrocarbon hydroisomerization, both isomerization selectivity and isomerization product yield are significantly increased.

SUMMARY OF THE INVENTION

A SAPO-11 silicoaluminophosphate molecular sieve, its preparation method, and a catalyst containing the same are provided in this invention. The X-ray diffraction data of said molecular sieve before removing the template by calcination are as shown in Table 1, its molar composition after removing the template by calcination expressed in anhydrous oxides is $Al_2O_3:yP_2O_5:zSiO_2$, in which y has a value of 0.60–1.20, and z has a value of 0.05–1.3, characterized in that after removing the template by calcination, said molecular sieve has the main X-ray diffraction data as listed in Table 3, and the crystal structures of the molecular sieve before and after removing the template by calcination are substantially the same. Said catalyst is composed of 10–85% by weight of said SAPO-11 molecular sieve, 0.05–1.5% by weight of Pd or Pt, and alumina in balance. In comparison with similar catalysts in the prior art, both isomerization selectivity and product yield are significantly increased when the catalyst of this invention is applied in hydrocarbon hydroisomerization reaction.

DETAILED DESCRIPTION OF THE INVENTION

The major X-ray diffraction peaks of the silicoaluminophosphate molecular sieve with AEL structure (SAPO-11) provided in this invention before removing the template by calcination are as listed in Table 1. Its molar composition after removing the template by calcination expressed in anhydrous oxides is $Al_2O_3:yP_2O_5:zSiO_2$, in which y has a value of 0.60–1.20, z has a value of 0.05–1.3, characterized in that its X-ray diffraction data after removing the template by calcination are as listed in Table 3, in which the conditions of said calcination are the conventional conditions used in the prior art for removing the template in this class of molecular sieves. The molar composition of the silicoaluminophosphate molecular sieve with AEL structure (SAPO-11) provided in this invention before removing the template by calcination expressed in anhydrous oxides is $xR:Al_2O_3:yP_2O_5:zSiO_2$, wherein R is the organic template presented in the channels of the molecular sieve, and may be an organic template conventionally used in the prior art, with di-n-propylamine or di-isopropylamine or their mixture being preferred; x has a value of 0.01–0.35, preferably 0.03–0.25; y has a value of 0.60–1.20, preferably 0.75–1.05; and has a value of 0.05–1.3, preferably 0.1–1.1.

The positions of the XRD peaks of the silicoaluminophosphate molecular sieve provided in this invention before calcination are the same as those of the aluminophosphate molecular sieve with AEL structure (its main diffraction peaks are as listed in Table 1), indicating that it has AEL crystal structure. From the data of Table 3, it can be seen that the XRD peaks of the molecular sieve after calcination have substantially the same positions as those of the molecular sieve before calcination, though the intensities of the XRD peaks are slightly different. This indicates that the crystal structure of the molecular sieve provided in this invention is very stable, its crystal structures are substantially the same before and after calcination.

TABLE 3

| 2θ | d | 100 × $I/I_0$ |
|---|---|---|
| 8.00–8.10 | 11.04–10.91 | s |
| 9.45–9.60 | 9.35–9.21 | s |
| 13.05–13.15 | 6.78–6.73 | m |
| 15.70–15.90 | 5.64–5.57 | m |
| 20.20–20.40 | 4.39–4.35 | m |
| 21.15–21.65 | 4.20–4.10 | vs |
| 22.23–22.39 (doublet) | 3.99–3.97 | m |
| 22.73–22.90 (doublet) | 3.91–3.88 | m |
| 23.28–23.31 | 3.82–3.81 | m |

*m: 20–70  s: 70–90  vs: 90–100

The method provided in this invention for synthesizing silicoaluminophosphate molecular sieves with AEL structure comprises: mixing an aluminum source, a silicon source, a phosphorus source, and an organic template to make a gelatinous reaction mixture with a molar composition of aR: $Al_2O_3$: $bP_2O_5$: $cSiO_2$: $dH_2O$, then crystallizing the mixture by steam treating, and filtering, washing, drying, and calcining the crystallized product, characterized in that said gelation temperature is in a range of 25–60° C., preferably 28–42° C., more preferably 30–40°C., said crystallization conditions are a temperature range of 140–190° C., preferably 150–180° C., more preferably 160–175° C., a autogenous pressure, and a duration of 4–60 hours, preferably 10–40 hours; a has a value of 0.2–2.0, preferably 0.3–1.5, more preferably 0.5–1.0; b has a val of 0.6–1.2, preferably 0.8–1.1; c has a value of 0.1–1.5, preferable 0.3–1.2; d has a value of 15–50, preferably 20–40, more preferably 25–35.

Said sources of aluminum, silicon and phosphorus, and organic template in the method provided in this invention are the corresponding raw materials typically used in the prior art. Said aluminum source includes aluminum hydroxide, hydrated alumina, aluminum isopropoxide or aluminum phosphate; said silicon source includes solid silica gel or silica sol; said phosphorus source includes phosphoric acid or aluminum phosphate; and said organic template includes di-n-propylamine, di-isopropylamine or their mixture.

In the method provided by this invention, said calcination conditions are the conditions typically used in the prior art, in which the preferred conditions are at 500–650° C. for 2–10 hours.

The key of the method provided in this invention is that the gelation temperature of the raw materials is controlled at an adequate range slightly higher than the room temperature, and at the same time, the crystallization temperature is controlled at a relatively low temperature range. If the gelation temperature exceeds the range provided in this invention, or the crystallization temperature is higher than 200° C., the structure stabilized SAPO-11 of this invention can not be obtained.

The molecular sieve provided in this invention can be used as a component of the catalysts for hydrocarbon isomerization, catalytic dewaxing, freezing point depression of diesel oil or lubricant oil, etc, especially can be used as a catalyst for hydrocarbon hydroisomerization after supporting noble metals. In order to make the molecular sieve into a metal containing bifunctional catalyst, the molecular sieve can be firstly calcined to remove template, and then impregnated with metal components, or firstly impregnated with metal components, and then calcined to remove template. The noble metal can be Pt, Pd, or the mixture thereof.

The silicoaluminophosphate molecular sieve with AEL structure provided in this invention or obtained by the method provided in this invention has superior structural stability, that is, after removing the template by calcination, its XRD pattern data are substantially unchanged in comparison with those before removing the template by calcination. In comparison with the catalysts containing molecular sieves obtained with the prior art, when this molecular sieve is impregnated with palladium or platinum components and used for hydrocarbon hydroisomerization reaction, the isomerization selectivity and product yield are significantly increased.

The hydrocarbon hydroisomerization catalyst provided by this invention is comprised of 10–85 wt. % of silicoaluminophosphate molecular sieve with AEL structure (SAPO-11), 0.05–1.5 wt. % of Pd or Pt, and alumina in balance, wherein the molar composition of said SAPO-11 molecular sieve expressed in anhydrous oxides is $Al_2O_3$: (0.60–1.20) $P_2O_5$: (0.05–1.3) $SiO_2$, and characterized in that the main X-ray diffraction pattern data of said SAPO-11 molecular after removing the template by calcination are as listed in Table 3. Said calcination conditions are the conventional conditions in the prior art for removing the organic template in the same class of molecular sieves.

The preferred catalyst provided in this invention is composed of 20–80 wt. % of said SAPO-11 molecular sieve, 0.1–1.2 wt. % Pd or Pt, and a balanced amount of alumina.

The method provided in this invention for preparing the catalyst is the conventional impregnation method in the prior art, which comprises: mixing, kneading, and molding said SAPO-11 molecular sieve, a precursor of alumina, deionized water, and nitric acid; drying and calcining the formed product; supporting a compound of Pd or Pt or their mixture by impregnation; drying and calcining the impregnated support to yield the catalyst of this invention, wherein said precursor of alumina may be a precursor commonly used in the prior art, which converts to $\gamma$-$Al_2O_3$ after calcination, no other limitation being placed on by this invention. The precursor can be one or several compounds selected from the group consisting of amorphous aluminum hydroxide, pseudo-beohmite, alumina tri-hydrate and bayerite, wherein pseudo-beolimite is preferred. Said alumina in this invention is the alumina obtained by calcining the above precursors at 400–700° C. for 1–5 hours.

Said SAPO-11 molecular sieve can be calcined to remove the organic template either before, or after said catalyst is molded by extruding. No matter the calcination proceeds before or after extruding, the molecular sieves in the catalysts of this invention can all keep the stable crystal structure. Said calcination conditions for removing the template are those typically used in the prior art, in which the preferred conditions are keeping consistent at 500–650° C. for 2–10 hours.

The catalyst provided in this invention can be used for isomerization, catalytic dewaxing of hydrocarbon, freezing point hydro-depression of diesel oil or lubricant oil, etc., especially for hydroisomerization of the lubricant oil with a boiling range of 350–580° C. and the diesel oil with a boiling range of 160–400° C. In order to make the molecular sieve into a metal containing to bifunctional catalyst, the molecular sieve can be firstly calcined to remove template, and then impregnated with a metal component, or firstly impregnated with a metal component, and then calcined to remove the template.

Since the silicoaluminophosphate molecular sieve with AEL structure provided by this invention has superior structure stability, which is shown by its substantially unchanged data of the XRD pattern after removing the template by calcination in comparison with those before removing the-template by calcination. Compared with the catalysts in the prior art, the catalyst displays higher isomerization selectivity and isomerization product yield when used in hydroisomerization of hydrocarbon.

This invention will further be illustrated by the following examples. The compositions of the molecular sieves in the examples and comparative examples are detected by X-ray fluorescence spectroscopy.

ILLUSTRATION BY EXAMPLES

Example 1–2

145.3 g of phosphoric acid (containing 85 wt % of $H_3PO_4$, the same below) and 217.6 g of deionized water were added into a gelation autoclave in a water-bath at 35° C. and mixed by stirring to uniformity, and after stirring for 30 min, 99.2 g of hydrated alumina (i.e., pseudo-boehmite containing 72 wt % $Al_2O_3$, a commodity of the Catalyst Plant of Baling Petrochemical Corporation, China, the same below) was added and mixed by stirring for 2 hour. Subsequently, 14.17 g of di-n-propylamine (chemically pure, the same below ) and 21.25 g of di-isopropylamine (chemically pure, the same below) were added into the aforesaid gelation autoclave after mixing to uniformity, and mixed again by continuous stirring for 2 hours. Finally, 64.62 g of silica sol (containing 26 wt % of $SiO_2$, a commodity of the Changhong Chemical Plant, Beijing, the same below) was added and stirred thoroughly for 2 hours, and thus a reaction mixture was prepared. A part of the mixture was sealed in a stainless steel crystallization autoclave, then crystallized at 160° C. and the autogenous pressure for 24 hours. The crystallized product was then filtered, washed, and dried at 100–110° C. to obtain a molecular sieve product as raw powder. A part of the crystallized product was detected by X-ray powder diffraction (the apparatus is a Bruker D5005 model, Germany), and the results are coincident with the data listed in Table 1. This denotes that the synthesized molecular sieve by the method of this invention is a molecular sieve having AEL structure.

A part of the molecular sieve sample as raw powder was heated in a muffle furnace to a temperature of 550° C. and kept constant for 3 hours, then cooled automatically in air to the room temperature. The calcined sample was detected by X-ray powder diffraction, and the resulting data are listed in Table 4. This result proves that the structure of the unit cell of the molecular sieve remains substantially unchanged after calcination. The molar composition of the molecular sieve after calcination is $Al_2O_3$: $0.85P_2O_5$: $0.55SiO_2$.

Said molecular sieve as raw powder obtained above was mixed with hydrated alumina (the same as above) in a weight ratio of molecular sieve: hydrated alumina=70:30 (dry basis), then the mixture was molded by extrusion into cylinders with a diameter of 1.50 mm. Then, the extrudate was dried at 120° C. for 6 hours, and calcined in a calcining furnace at 550° C. for 6 hours. Said calcined cylinders were impregnated by saturated impregnation with a $Pd[NH_3]_4Cl_2$ solution as an impregnation solution in an amount of 0.6 wt % of Pd. The product obtained was dried at 120° C. for 6 hours, and calcined in flowing air at 600° C. for 3 hours. Finally, the cata was crushed to 20–40 mesh particles for catalyst evaluation. The obtained catalyst is denoted as A.

Another catalyst was also prepared according to the above method, except that the $Pd[NH_3]_4Cl_2$ solution was replaced by a $H_2PtCL_6$ solution as an impregnation solution. A catalyst with a Pt content of 0.50 wt % was obtained, which is denoted as B.

TABLE 4

| 2 θ | d | 100 × I/I$_0$ |
|---|---|---|
| 8.08 | 10.93 | 78.3 |
| 9.50 | 9.30 | 76.4 |
| 13.09 | 6.76 | 38.2 |
| 13.79 | 6.42 | 14.3 |
| 15.76 | 5.62 | 61.1 |
| 20.29 | 4.372 | 39.0 |
| 21.22 | 4.183 | 100.0 |
| 22.24 (doublet) | 3.994 | 54.3 |
| 22.89 (doublet) | 3.881 | 46.0 |
| 23.31 | 3.813 | 55.7 |
| 24.48 | 3.364 | 13.6 |
| 24.99 | 3.560 | 13.8 |
| 26.46 | 3.366 | 24.0 |
| 28.90 | 3.087 | 9.8 |
| 29.56 | 3.020 | 12.8 |

Example 3

46.1 g of phosphoric acid and 75.7 g of deionized water were added into a gelation autoclave in a water bath at 30° C. and mixed by stirring to uniformity, and after stirring for 30 min, 28.3 g of hydrated alumina was added and mixed by stirring for 2 hours. Subsequently, 14.17 g of di-n-propylamine was added into the gelation autoclave, and 13.85 g of silica sol was added immediately after the completion of the addition of di-n-propylamine. This mixture was stirred thoroughly for 2 hours to make a reaction mixture, and the prepared reaction mixture was sealed into a stainless steel crystallization autoclave and crystallized at 175° C. and the autogenous pressure for 24 hours. After that, the crystallized product was filtered, washed, and dried at 100–110° C. to obtain a molecular sieve product as raw powder. A part of the product as raw powder was detected by X-ray powder diffraction, and the result coincides with the data listed in Table 1. This denotes that the molecular sieve synthesized by this method is a molecular sieve with AEL structure.

A part of the above molecular sieve as raw powder was calcined in a muffle furnace at 550° C. for 3 hours, then cooled in air automatically to the room temperature. The calcined sample was detected by X-ray powder diffraction, and the result data coincide with the data listed in Table 3. This proves that the structure of the unit cell of the molecular sieve remains substantially unchanged after calcination. The molar composition of the molecular sieve after calcination is $Al_2O_3$: $0.92P_{2O5}$: $0.40SiO_2$.

The molecular sieve as raw powder obtained in Example 3 was prepared into a catalyst according to the same method as in Example 1, except that the Pd content of the catalyst was 0.50 wt. %. The obtained catalyst is denoted as C.

Example 4–5

46.1 g of phosphoric acid and 58.6 g of deionized water were added into a gelation autoclave in a water bath at 30° C. and mixed by stirring to uniformity, and after stirring for 30 min, 28.3 g of hydrated alumina was added and mixed with stirring for 2 hours. Subsequently, 14.17 g of di-n-propylamine was added into the gelation autoclave, and 36.92 g of silica sol was added immediately after the completion of the addition of di-n-propylamine. This mixture was stirred thoroughly for 2 hours to make a reaction mixture, and the prepared reaction mixture was sealed into a stainless steel crystallization autoclave and crystallized at 175° C. and the autogenous pressure for 24 hours. After that, the crystallized product was filtered, washed, and dried at 100–110° C. to obtain the molecular sieve product as raw powder. A part of the crystallized product was detected by X-ray powder diffraction, and the result coincides with the data listed in Table 1. This denotes that the molecular sieve synthesized by this method is a molecular sieve with AEL structure.

A part of the above molecular sieve as raw powder was calcined in a muffle furnace at 550° C. for 3 hours, then cooled in air automatically to the room temperature. The calcined sample was detected by X-ray powder diffraction, and the result data coincide with the data listed in Table 3. This proves that the structure of the unit cell of the molecular sieve remains substantially unchanged after calcination. The molar composition of the molecular sieve after calcination is $Al_2O_3$: $0.90P_{2O5}$: $1.02SiO_2$.

The molecular sieve as raw powder obtained in Example 4 was prepared into a catalyst according to the same method as in Example 1, except that the Pd content of the catalyst is 0.30 wt. %. The obtained catalyst is denoted as D.

The molecular sieve as raw powder obtained in Example 4 was prepared into a catalyst again according to the same method as in Example 1, except that the Pd content of the catalyst was 1.00 wt. %. The obtained catalyst is denoted as E.

Example 6

46.1 g of phosphoric acid and 83.6 g of deionized water were added into a gelation autoclave in a water bath at 30° C. and mixed by stirring to uniformity, and after stirring for 30 min., 81.7 g of aluminum isopropoxide (analytically pure, a commodity of Donghuan Combined Chemical Plant, Beijing) was added and mixed by stirring for 2 hours. Subsequently, 14.17 g of di-n-propylamine was added into the gelation autoclave, and 13.85 g of silica sol was added immediately after the completion of the addition of di-n-propylamine. This mixture was stirred thoroughly for 2 hours to make a reaction mixture, and the prepared reaction mixture was sealed into a stainless steel crystallization autoclave and crystallized at 175° C. and the autogenous pressure for 24 hours. After that, the crystallized product was filtered, washed, and dried at 100–110° C. to obtain the molecular sieve product as raw powder. A part of the product as raw powder was detected by X-ray powder diffraction, and the result coincides with the data listed in Table 1. This denotes that the molecular sieve synthesized by this method is a molecular sieve with AEL structure.

A part of the above molecular sieve as raw powder was calcined in a muffle furnace at 550° C. for 3 hours, then cooled in air automatically to the room temperature. The calcined sample was detected by X-ray powder diffraction, and the result data coincide with the data listed in Table 3. This proves that the structure of the unit cell of the molecular sieve remains substantially unchanged after calcination. The molar composition of the molecular sieve after calcination is $Al_2O_3$: $0.90P_2O_5$: $0.43SiO_2$.

The molecular sieve as raw powder obtained in Example 6 was prepared into a catalyst according to the same method as in Example 1, except that the weight ratio of the molecular sieve to alumina was 30:70 by dry basis, and that the Pd content of the catalyst was 0.50 wt. %. The obtained catalyst is denoted as F.

Example 7

41.5 g of phosphoric acid and 55.4 g of deionized water were added into a gelation autoclave in a water bath at 38° C. and mixed by stirring to uniformity, and after stirring for 30 min., 28.3 g of hydrated alumina was added and mixed by stirring for 2 hours. Subsequently, a mixture of 6.07 g of di-n-propylamine and 4.05 g of di-isopropylamine was added after mixing to uniformity and, 27.69 g of silica sol was added immediately after the completion of the addition of the organic amines. Thus derived mixture was stirred thoroughly for 2 hours to make a reaction mixture, and the prepared reaction mixture was sealed into a stainless steel crystallization autoclave and crystallized at 160° C. and the autogenous pressure for 24 hours. After that, the crystallized product was filtered, washed, and dried at 100–110° C. to obtain the molecular sieve product as raw powder. A part of the product as raw powder was detected by X-ray powder diffraction, and the result coincides with the data listed in Table 1. This denotes that the molecular sieve synthesized by this method is a molecular sieve with AEL structure. A part of the above molecular sieve as raw powder was calcined in a muffle furnace at 550° C. for 3 hours, then cooled in air automatically to the room temperature. The calcined sample was detected by X-ray powder diffraction, and the result coincides with the data listed in Table 3. This proves that the structure of the unit cell of the molecular sieve remains substantially unchanged after calcination. The molar composition of the molecular sieve after calcination is $Al_2O_3$: $0.91P_2O_5$: $0.73SiO_2$.

The molecular sieve as raw powder obtained in Example 7 was prepared into a catalyst according to the same method as in Example 1, except that the weight ratio of the molecular sieve to alumina was 50:50 by dry basis, and that the Pd content was 1.00 wt. %. The obtained catalyst is denoted as G.

Comparative Example 1

This present comparative example illustrates the effect of the SAPO-11 molecular sieve and catalyst prepared by the method of the prior art.

According to the same method and steps described in Example 18 of U.S. Pat. No. 4,440,871, a comparative molecular sieve sample was synthesized (with a gelation temperature of 200C). This comparative sample was examined by X-ray powder diffraction before and after calcination, the result is coincident with the data listed in Table 1 and Table 2 respectively, showing that the structure of the molecular sieve is apparently changed after calcination. The molar composition of the molecular sieve after calcination was $Al_2O_3$: $0.88P_2O_5$: $0.36SiO_2$.

The molecular sieve as raw powder of this comparative example was prepared into a catalyst before calcination according to the same method in Example 1, the catalyst obtained is denoted as Comparative Cat.-1.

Comparative Example 2

This present comparative example illustrates the effect of the molecular sieve synthesized according to the method of the prior art.

92.2 g of phosphoric acid and 144.6 g of deionized water were added into a gelation autoclave in a water bath at 20° C. and mixed by stirring to uniformity, and after stirring for 30 min, 56.7 g of hydrated alumina was added and mixed by stirring for 2 hours. Then 36.92 g of silica sol was added and thoroughly stirred for 2 hours. Finally, a mixture of 14.17 g of di-n-propylamine and 14.17 g of di-isopropylamine was added into the gelation autoclave after mixing to uniformity. The derived mixture was continually stirred for 2 hours to make a reaction mixture, and a part of the reaction mixture was sealed into a stainless steel crystallization autoclave and crystallized at 200° C. and the autogenous pressure for 24 hours. After that, the crystallized product was filtered, washed, and dried at 100–110° C. to obtain the comparative molecular sieve product as raw powder. A part of the product as raw powder was detected by X-ray powder diffraction, and the result coincides with the data listed in Table 1. This denotes that the molecular sieve synthesized by this method is a molecular sieve with AEL structure.

A part of the above molecular sieve as raw powder was calcined in a muffle furnace at 550° C. for 3 hours, then cooled in air automatically to the room temperature. The calcined sample was detected by X-ray powder diffraction, and the result proves that the sample is a mixture of the molecular sieves with space groups of Ima2 and $Pna2_1$ rather than a pure molecular sieve sample of space group Ima2. The molar composition of the molecular sieve after calcination is $Al_2O_5$: $0.83P_2O_5$: $0.50SiO_2$.

The present comparative sample as raw powder was prepared into a catalyst before calcination according to the same method as in Example 1, and the obtained catalyst is denoted as Comparative Cat.-2.

Example 8

This example is for illustrating the effects of the catalysts of the present invention and the comparative catalysts when used in paraffin hydroisomerization.

The catalyst evaluation was carried out on a pulse microreactor. The parameters of the experiment were: catalyst loading was 0.10 g; the particle size of the catalyst was 20–40 mesh; the reactant was n-octane ($C_8^0$); the amount of a reactant pulse was 0.5 µl; the carrier gas was hydrogen, and the flow rate of the carrier gas was 30 m/min. The reaction product was analyzed with an on-line gas chromatograph. The catalyst was firstly reduced with hydrogen before reaction evaluation. The reduction conditions were that the temperature was raised to 500° C. in a rate of 5° C./min. by temperature programmed heating and kept constant at 500° C. for 2 hours. The reaction temperature was 360° C.

The target products were the isomerization products of $C_8^0$ ($i$-$C_8^0$). The evaluation results are listed in Table 5.

TABLE 5

| | | | Reaction temperature: 360° C. | | |
|---|---|---|---|---|---|
| Catalyst No. | Content of Molecular Sieve % | Metal and its loading % | Conversion % | $iC_8$ Selectivity % | $iC_8$ Yield % |
| A | 70 | 0.60% Pd | 50.50 | 91.09 | 46.00 |
| B | 70 | 0.50% Pt | 52.95 | 78.87 | 41.76 |
| C | 70 | 0.50% Pd | 55.55 | 85.02 | 47.23 |
| D | 70 | 0.30% Pd | 53.65 | 81.60 | 43.78 |
| E | 70 | 1.00% Pd | 55.59 | 78.70 | 43.75 |
| F | 30 | 0.50% Pd | 36.80 | 89.36 | 32.88 |
| G | 50 | 1.00% Pd | 54.10 | 84.70 | 45.82 |
| Comp. Cat.-1 | 70 | 0.60% Pd | 50.45 | 62.08 | 31.32 |
| Comp. Cat.-2 | 70 | 0.60% Pd | 53.44 | 72.09 | 38.52 |

It can be seen apparently from the evaluation results in Table 5 that, compared with the molecular sieves in the prior art, wherein the crystal structure is changed before and after calcination, the bifunctional catalysts with the molecular sieves of the present invention as acidic active components have significantly higher selectivity and higher yields for the isomerization products.

Example 9

This example is for illustrating the effect of the catalyst of the present invention when used in luboil hydroisomerization.

The reaction evaluation was carried out on a pressurized fixed-bed micro-reactor. The loading of Catalyst C was 20 ml with a particle size of 20–40 mesh. The feed oil was a tail oil of hydrocracking having a boiling range of 350–545° C, a pouring point of 30° C., and a viscosity index of 125. The reaction conditions used were as following: reaction temperature 360° C., reaction pressure 5.0 MPa, liquid hourly space velocity 1.5 h$^{-1}$, hydrogen flow rate 180 ml/min. The catalyst was firstly reduced with hydrogen before reaction evaluation. The reduction conditions were that the temperature was raised in a rate of 5C./min. to 500° C. by temperature programmed heating and hold for 2 hours, then lowered to the reaction temperature to proceed the evaluation. The reaction product was cooled, collected, and fractionated. The product yield was calculated based on the luboil faction obtained, and the pouring point (GB/T 3535) and viscosity index (GB/T 2541) were measured. The evaluation results show that the luboil yield was 84.2%, pouring point –16° C., and viscosity index 120.

It can be seen apparently from these evaluation results that the bifunctional catalysts with the molecular sieves of the present invention as an acidic active component have superior hydroisomerization performances.

Example 10

This example is for illustrating the effect of the catalysts of the present invention when used for diesel oil hydroisomerization for depressing freezing point.

The reaction evaluation was carried out on a fixed-bed micro-reactor, wherein 20 ml of Catalyst C with a particle size of 20–40 mesh was loaded. The feed oil has a boiling range of 180–350° C. and a freezing point of 30° C. The reaction conditions used were as follows: reaction temperature 360° C., reaction pressure 4.0OMPa, liquid hourly space velocity 1.5 h$^{-1}$, and hydrogen flow rate 180 ml/min. The catalyst was firstly reduced with hydrogen before reaction evaluation. The reduction conditions were that the temperature was raised in a rate of 5° C./min. to 500° C. by temperature programmed heating, and held for 2 hours, then lowered to reaction temperature to proceed reaction evaluation. The reaction product was cooled, collected, and fractionated. The product yield was calculated based on diesel oil fraction obtained, and the freezing point was measured (GB/T 510). The evaluation results show that the diesel oil yield is 92.82%, and its freezing point is –18° C.

It can be seen apparently from these evaluation results that the bifunctional catalysts with the molecular sieves of the present invention as an acidic active component have superior hydroisomerization performances.

What is claimed is:

1. A SAPO-11 silicoaluminophosphate molecular sieve, the molar composition of which after removing the template by calcination can be expressed in anhydrous oxides as $Al_2O_3$: $yP_2O_5$: $zSiO_2$, in which y has a value of 0.60–1.20, and z has a value of 0.05–1.3; characterized in that after removing the template by calcination, said molecular sieve has the main X-ray diffraction data as listed in Table 3.

TABLE 3

| 2θ | d | 100 × I/I$_0$ |
|---|---|---|
| 8.00–8.10 | 11.04–10.91 | s |
| 9.45–9.60 | 9.35–9.21 | s |
| 13.05–13.15 | 6.78–6.73 | m |
| 15.70–15.90 | 5.64–5.57 | m |
| 20.20–20.40 | 4.39–4.35 | m |
| 21.15–21.65 | 4.20–4.10 | vs |
| 22.23–22.39 (doublet) | 3.99–3.97 | m |
| 22.73–22.90 (doublet) | 3.91–3.88 | m |
| 23.28–23.31 | 3.82–3.81 | m |

*m: 20–70    s: 70–90    vs: 90–100.

2. The molecular sieve according to claim 1, wherein y has a value of 0.75–1.05, and z has a value of 0.1–1.1.

3. The molecular sieve according to claim 1, the molar composition of which before removing the template is xR: $Al_2O_3$: $yP_2O_5$: $zSiO_2$ when expressed in anhydrous oxides, in which R is an organic template presented in the pore of the molecular sieve, x has a value of 0.01–0.35, and the values of y and z are as defined in claim 1.

4. The molecular sieve according to claim 3, wherein said organic template is di-n-propylamine-or di-isopropylamine or the mixture thereof.

5. The molecular sieve according to claim 3, wherein x has a value of 0.03–0.25.

6. A method for synthesizing the molecular sieve according to claim 1, comprising mixing an aluminum source, a silicon source, a phosphorus source, and an organic template, to make a gelatinous reaction mixture with a molar ratio of aR: $Al_2O_3$: $bP_2O_5$: $cSiO_2$: $dH_2O$, crystallizing the mixture by steam treating, and filtering, washing, drying, and calcining the crystallized product, characterized in that the gelation temperature is in a range of 25–60° C., and said crystallization by steam treating is carried out at the temperature of 140–190° C. and under the autogenous pressure for 4–60 hours, in which a has a value of 0.2–2.0, b has a value of 0.6–1.2, c has a value of 0.1–1.5, and d has a value of 15–50.

7. The method according to claim 6, wherein said aluminum source is aluminum hydroxide, hydrated alumina, aluminum isopropoxide, or aluminum phosphate, said silicon source is solid silica gel or silica sol, said phosphorus source, is phosphoric acid or aluminum phosphate, and said organic template is di-n-propylamine, di-isopropylamine, or the mixture thereof.

8. The method according to claim 7, wherein said aluminum source is hydrated alumina or aluminum isopropoxide, and said phosphorus source is phosphoric acid.

9. The method according to claim 6, wherein said calcination condition is at 500–650° C. for 2–10 hours.

10. The method according to claim 6, wherein said gelation temperature is in the range of 28–42° C.

11. The method according to claim 10, wherein said gelation temperature is in the range of 30–40° C.

12. The method according to claim 6, wherein said crystallization temperature is in the range of 150–180° C.

13. The method according to claim 6, wherein said crystallization time is 10–40 hours.

14. The method according to claim 6, wherein a has a value of 0.3–1.5.

15. The method according to claim 14, wherein a has a value of 0.5–1.0.

16. The method according to claim 6, wherein b has a value of 0.8–1.1.

17. The method according to claim 6, wherein c has a value of 0.3–1.2.

18. The method according to claim 6, wherein d has a value of 20–40.

19. The method according to claim 18, wherein d has a value of 25–35.

20. A catalyst for hydrocarbon hydroisomerization which is composed of 10–85 wt. % of the SAPO-11 molecular sieve in claim 1, 0.05–1.5 wt. % of Pd or Pt, and alumina in balance.

21. The catalyst according to claim 20 which is composed of 20–80 wt. % of said SAPO-11 molecular sieve, 0.1–1.2 wt. % of Pd or Pt, and alumina in balance.

22. The catalyst according to claim 21, wherein said SAPO-11 molecular sieve has a molar composition of $Al_2O_3$: (0.75–1.05) $P2O_5$: (0.1–1.1) $SiO_2$.

23. The catalyst according to claim 20, wherein said alumina is obtained by calcining its precursor at 400–700° C. for 1–5 hours, and said precursor of alumina is at least one compounds selected from the group consisting of aluminum hydroxide, pseudo-boehmite, alumina trihydrate, and bayerite.

24. The catalyst according to claim 23, wherein said precursor of alumina is pseudo-boehmite.

25. The catalyst according to claim 20, wherein said hydrocarbon is lubricant oil with a boiling range of 350–580° C.

26. The catalyst according to claim 20, wherein said hydrocarbon is diesel oil with a boiling range of 160–400° C.

27. A hydroisomerization process for depressing the freezing point of diesel oil or lubricant oil comprising contacting the oil with the catalyst according to claim 20.

* * * * *